April 22, 1958    A. R. GEMPERLE ET AL    2,831,652
PRODUCTION OF MICROSPHEROIDAL CATALYSTS
Filed Nov. 24, 1954

INVENTORS
ALBERT R. GEMPERLE,
JOHN J. SCHILF,
BY

*Wm. P. Spielman*
ATTORNEY.

United States Patent Office 2,831,652
Patented Apr. 22, 1958

2,831,652
PRODUCTION OF MICROSPHEROIDAL CATALYSTS

Albert R. Gemperle, Michigan City, and John J. Schilf, La Porte, Ind., assignors to American Cyanamid Company, New York, N. Y., a corporation of Maine Application November 24, 1954, Serial No. 470,946

5 Claims. (Cl. 252—448)

This invention relates to methods for the production of microspheroidal siliceous catalysts and is directed particularly to the production of catalysts of this class having improved sphericity and attrition resistance. The invention includes both the improved manufacturing processes for producing such catalysts that will hereinafter be described and also the improved catalysts resulting therefrom.

Microspheroidal catalysts are at present in wide commercial use for a variety of vapor-phase reactions wherein the fluidized catalyst technique is used. In carrying out reactions of this type a stream of reaction gases is passed upwardly through a large reactor containing the fluidized catalyst in finely divided form. The finely divided catalyst particles are in constant motion in the gas stream and therefore collide and rub over each other. Any projections or irregularities of the catalyst particles are therefore likely to be rubbed or broken off with the formation of fines which are carried away by the gas stream. Loss in catalyst through attrition is therefore related directly to the shape of the catalyst particles, and experience has shown that the more nearly spherical these particles are the smaller will be the loss due to attrition. It is a principal object of the present invention to produce finely divided siliceous catalysts in the form of almost perfect microspheres wherein losses through attrition are reduced to a minimum.

Another important factor in a microspheroidal catalyst is its range of particle size distribution. For a catalyst of any given particle size certain definite gas speeds are required, and catalyst particles much smaller than the average are likely to be carried out of the reactor by the gas stream just as are the fines formed by attrition. Catalyst particles much larger than the average, on the other hand, are incompletely fluidized and are apt to cause slugging in the reactor. For this reason the catalytic hydrocarbon oil cracking industry, which is the largest single user of fluidized catalysts, has established definite standards for particle size distribution in microspheroidal catalyst with specifications that must be met by catalyst manufacturers. The test used for determining particle size distribution is known as the Roller API test and is described in the "Petroleum Refiner" for June 1951. In conducting this test a measured quantity of catalyst is filled into a set of four tubes of definite cross section and fluidized with air at measured, constant rates. The quantity of catalyst passing out from the tops of these tubes is measured and expressed as percent of the total charge. It is another important object of the present invention to produce microspheroidal catalysts having a particle size distribution that is controlled within predetermined ranges, with a large proportion of the catalyst having a diameter within the range of 40 to 80 microns, characterized by a high degree of sphericity and attrition resistance.

Catalysts composed of silica and alumina, of silica and magnesia, and of silica, alumina and magnesia are at present most widely used for the catalytic vapor-phase cracking of petroleum fractions. The silica-alumina catalysts usually contain about 10% to 30% by weight of alumina, the balance being substantially all silica. The silica-magnesia catalysts consist of silica gel containing about 20% to 40% of magnesium oxide, while the three-component catalysts usually contain about 1% to 5% by weight of alumina and about 15% to 35% of magnesium oxide, the balance being substantially all silica. Any of these catalysts can be manufactured by the process of the present invention in the form of microspheres of improved sphericity and attrition resistance, as will subsequently be explained.

In producing silica-containing catalysts of the above and similar types an aqueous slurry of gelatinous silica is first formed and impregnated wtih alumina, magnesia or other activating metal oxide. The silica may be produced in the form of gel particles by adding a stream of aqueous sodium silicate to a body of acid or a slurry of precipitated silica particles may be formed by adding the acid to the sodium silicate solution. Impregnation or coating of the silica particles is carried out by impregnating them with a water-soluble aluminum compound such as aluminum sulfate solution followed by precipitation of the alumina by adding ammonium hydroxide or other base. When silica-magnesia catalysts are produced the silica is impregnated simply by adding an aqueous slurry of hydrated magnesium oxide and agitating until a uniformly impregnated material is obtained. The resulting dispersions of hydrated silica-containing catalyst material are then injected into a spray drier, preferably at concentrations of about 4% to 9%, and are contacted therein with a current of hot gases to evaporate the free water of the slurry and dehydrate the hydrated silica to a hard gel. It is in this spray drying process that the catalyst gel is converted into microspheres, and our present invention is directed primarily to this phase of the manufacturing process.

Our experiments have shown that the shape of the spray-dried catalyst particles can be controlled to a large extent by the method used for injecting a catalyst slurry into the spray drier. Heretofore two injection methods have been used; either the slurry was sprayed into the drying chamber through stationary spray nozzles or it was fed to a rapidly rotating spray wheel and thrown outwardly into the drying chamber by centrifugal force. In both methods the slurry is broken into small droplets by discharge from relatively sharp edges, and we have found that such edges cause irregularities in the shape of the spray dried particles. In the dispersion process of our invention, passage of the catalyst-containing slurry over such edges is avoided; instead, the material is discharged from a set of rapidly moving convex surfaces. The improvements in sphericity and attrition resistance which we have obtained by discharging the silica-containing catalyst material from such rounded surfaces will be shown by the following examples.

In order to obtain a uniform control of the particle size distribution of the spray dried catalyst, with a larger weight percent of the dried material in the range of from 40–80 microns diameter that is desired for hydrocarbon oil cracking, we preferably homogenize or grind the hydrated silica-containing catalyst material before it is introduced into the spray drier. By homogenizing the slurry in this manner we reduce the dispersed phase thereof to finely divided particles which, upon spray drying, are converted into hardened spheres of the desired diameter. While the improved injection procedure of our invention can be applied to any aqueous dispersion of hydrated silica-containing catalyst material, it is particularly adapted for dispersing a previously homogenized slurry of this material into a spray drying chamber, since the dispersion method used does not distort or modify the spherical shape imparted to the hydrated silica-containing particles by homogenization.

The invention will be further described with reference to the accompanying drawings wherein.

Figure 1:
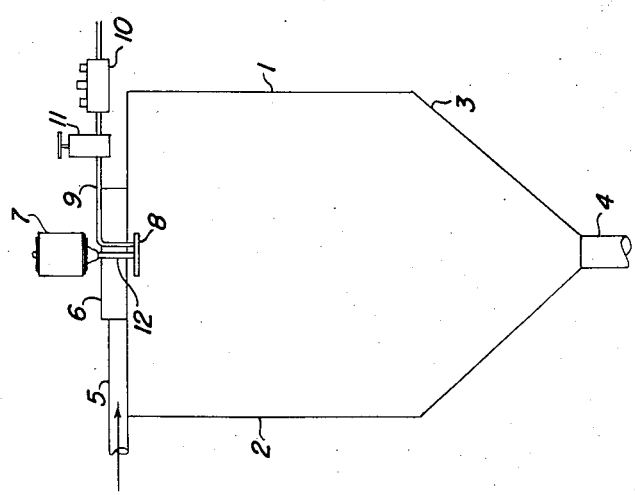
Fig. 1 is a diagrammatic illustration of a spray drier equipped with a high pressure pump, a homogenizing valve and a distributing wheel embodying the principles of the invention.

Referring to Fig. 1, the spray drier indicated generally by reference numeral 1 is more or less conventional in design. It is made up of a large cylindrical chamber 2 terminating in an outlet cone 3 and discharge pipe 4, an inlet pipe 5 and a gas distributor 6 for a current of hot gases, a spray machine 7 driving a distributing wheel 8, and an inlet pipe 9 for the material to be spray dried. This material is injected by a high pressure pump 10, which is preferably a piston-type pump, through a homogenizing valve 11 which breaks up any oversize particles in the silica-containing slurry and reduces the dispersed phase thereof to finely divided particles having a predetermined size distribution range. The pressure developed by the pump 10 is preferably on the order of about 1500–2500 pounds per square inch which are the optimum operating pressures for the homogenizing valve 11.

Figure 2:
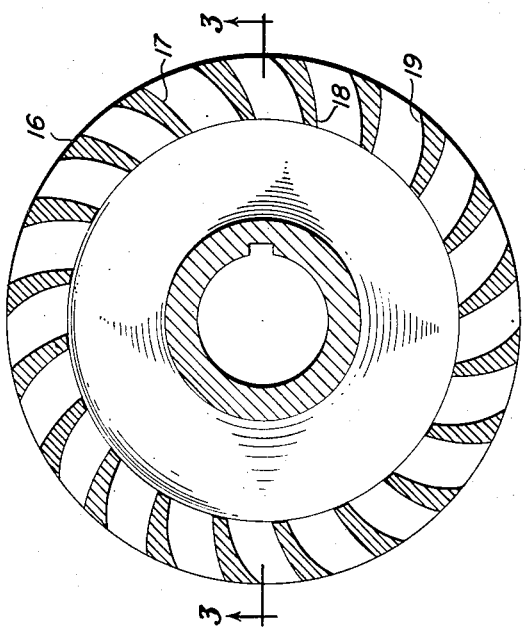
Fig. 2 is a horizontal section through the distributing wheel of Fig. 1, showing the profiles of the convex catalyst-distributing surfaces.
Figure 3:
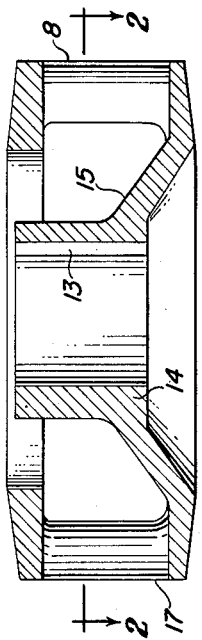
Fig. 3 is a vertical section on line 3—3 of Fig. 2 showing the construction of the distributor and in particular the angular distributing surfaces.

As is shown on Figs. 2 and 3 of the drawings, the distributor 8 is a vaned wheel adapted to be attached to the shaft 12 of the spray machine or motor 7 by a key located in the keyway 13. It consists generally of a hub-section 14, an outwardly inclined web section 15, and a peripheral set of vanes 16 having surfaces 17 which are convex in the clockwise direction of rotation shown on the drawing. The convex surfaces of these vanes are such that the catalyst-containing slurry will spread over them in thin films and will be thrown therefrom by centrifugal force without passing over any sharp edges. This reduces distortion of the catalyst-containing droplets to a minimum and results in the formation of spray dried catalyst particles of improved sphericity.

In carrying out the proces of our invention the catalyst-containing slurry, which is preferably although not necessarily homogenized by the valve 11 or other equivalent grinding or homogenizing device, is discharged through the inlet pipe 9 into the space surrounding the hub 14 of the distributor 8, and falls on the outwardly inclined web portion 15. This web is rotating at high speed, and therefore the silica-containing slurry is sprayed outwardly from the axis of rotation by centrifugal force. The resulting radial spray is intercepted by the convex surfaces 17 of the vanes 16, which are moving in a circular path around the axis of rotation, and is transformed into films that spread over these surfaces. The material is almost instantaneously discharged from the moving surfaces by centrifugal force but it is converted thereby into a mist of fine droplets which are projected into the current of hot gases that enter the spray drier from the gas distributor 6. The droplets are discharged from the convex surfaces 17 with a minimum of distortion, and therefore the spray dried product has a correspondingly high degree of sphericity with improved attrition resistance. After several weeks of continuous use a high polish can be noted on the inner or leading areas 18 of the surfaces 17 but none on the outer edges 19, proving that practically all of the slurry particles are thrown from the convex surfaces of the vanes before they reach the outer edges thereof.

As has been stated, optimum results are obtained when the above-described dispersing procedure is applied to hydrated silica-containing catalyst slurries which have previously been homogenized. Homogenization or grinding will break down the oversize particles dispersed in the slurry and will insure that practically all of the dispersed particles in the feed material are generally spherical in shape, but this is not completely effective when the particles are subsequently distorted by the injection methods previously used in spray drying. It will be understood, therefore, that the injection methods of the present invention aid in preserving the spherical shape of catalyst particles previously imparted thereto by homogenization and thus contribute materially to the production of microspheroidal catalyst having both a high degree of attrition resistance and a closely controlled range of particle size distribution.

The invention will be further described and illustrated by the following specific examples. It should be understood, however, that although these examples may describe certain particular features of the invention in detail, they are given primarily for purposes of illustration and the invention in its broader aspects is not limited thereto.

*Example*

A silica-alumina catalyst slurry containing approximately 13% of hydrated alumina and 87% of hydrated silica was prepared by the procedures described in Ashley et al. Patent No. 2,478,519; that is, by adding 25% sulfuric acid to an aqueous solution of sodium silicate, suspending the resulting silica slurry in water and impregnating it with the requisite amount of aluminum sulfate solution, precipitating by adding ammonia, and filtering and washing the resulting catalyst gel particles to remove sodium compounds. The catalyst gel slurry resulting from this procedure was passed through a Manton-Gaulin pump and homogenizing valve under the pump pressure; in this valve the slurry passes outwardly between a spring-pressed valve and its seat and its dispersed phase is broken down into particles having a predetermined particle size range. The resulting homogenized slurry was discharged into a spray drier by the process of the present invention and the resulting dried catalyst was tested for attrition resistance, particle size distribution, and examined under the microscope for sphericity. A number of spray drying runs were made wherein the homogenizing pressure, the wheel speed, and the gas temperature in the spray drier were varied. In all cases a distributor of the type shown in Figs. 2 and 3 of the drawings was used having a diameter of 8 inches and peripheral speeds within the range of about 15,000–30,000 feet per minute. The solids content of the spray drier feed slurry was between about 5.5 and 8.5%, as shown in the following table. The results of these tests were as follows:

| Run No. | Slurry Conc., Percent | Wheel Speed, R. P. M. | Homogenizing Press., Lbs. | Inlet Temp., °F. | Particle Size, Microns | | | | Attrition, Percent |
|---|---|---|---|---|---|---|---|---|---|
| | | | | | −50 | −40 | −30 | −20 | |
| 1 | 6.4 | 10,000 | 2,000 | 950 | 30 | 18 | 10 | 3 | 7 |
| 2 | 6.0 | 8,500 | 1,480 | 930 | 26 | 17 | 9 | 3 | 9 |
| 3 | 6.9 | 11,500 | 1,900 | 930 | 37 | 21 | 11 | 3 | 5 |
| 4 | 6.7 | 11,500 | 2,600 | 780 | 30 | 18 | 9 | 3 | 9 |
| 5 | 5.8 | 10,000 | 2,000 | 975 | 32 | 19 | 11 | 4 | 9 |
| 6 | 8.6 | 7,800 | 2,000 | 890 | 16 | 9 | 4 | 1 | 10 |
| 7 | 6.3 | 8,500 | 1,400 | 775 | 30 | 19 | 10 | 2 | 10 |
| 8 | 5.8 | 10,000 | 2,000 | 1000 | 33 | 20 | 10 | 1 | 10 |
| 9 | 5.9 | 10,000 | 2,000 | 950 | 30 | 19 | 10 | 3 | 10 |
| 10 | 6.2 | 10,000 | 2,000 | 525 | 28 | 15 | 6 | 0 | 8 |
| 11 | 5.9 | 12,500 | None | 500 | 41 | 22 | 10 | 3 | 7 |
| 12 | 6.0 | 12,500 | None | 850 | 37 | 23 | 11 | 4 | 8 |

The attrition tests were made by a procedure similar to that used in the Roller API test described above. Measured quantities of the catalyst were filled into a tube of definite cross section and fluidized with air at a measured, constant rate and the quantity of fines carried over after 45 hours of operation were determined by weighing. In the above table these quantities are expressed as percent of the initial charge.

Additional tests were made in which the direction of rotation of the distributor 8 was reversed so that the catalyst gel particles were discharged over the outer edges 19 on the opposite sides of the vanes. The same feed slurry was used, but without homogenization. A 35–40% increase in the power consumption of the spray machine motor was immediately noted, indicating that much more work was being done on the material as it was dispersed. This was confirmed by visual observation; whereas the normal rotation of the distributor produced an umbrella of discrete particles which could be discerned separately, a nebulous cloud was formed when the direction of rotation was reversed. Examination of the spray dried material under the microscope showed that the shapes of the particles were irregular, and this was confirmed by their relatively high attrition losses. The particle sizes and attrition losses of representative runs are given in the following table.

| Run No. | Slurry Conc., Percent | Wheel Speed, R. P. M. | Particle Size | | | | Attrition, Percent |
|---|---|---|---|---|---|---|---|
| | | | −100 Mesh | −200 Mesh | −40 Microns | −20 Microns | |
| 13 | 6.5 | 8,500 | 95 | 55 | 15 | 5 | 17 |
| 14 | 6.4 | 8,500 | 97 | 66 | 13 | 4 | 17 |
| 15 | 7.1 | 8,500 | 95 | 53 | 11 | 5 | 19 |
| 16 | 7.0 | 11,000 | 99 | 87 | 20 | 2 | 19 |
| 17 | 6.6 | 9,500 | 97 | 57 | 20 | 5 | 20 |
| 18 | 7.4 | 11,500 | 99 | 78 | 22 | 4 | 20 |

From the foregoing description and examples it will be seen that catalysts of excellent attrition resistance are produced by the process of the invention. Catalysts prepared from the same slurry, but using injection procedures wherein the slurry was passed over sharp edges during its introduction into the spray drier, showed attrition percentages within the range of 15–20% whereas percentages of 10% and lower are readily obtainable by the process of this invention.

What we claim is:

1. A method of producing microspheroidal siliceous catalysts of improved sphericity and attrition resistance which comprises spraying outwardly from an axis of rotation an aqueous dispersion of hydrated silica-containing catalyst material while simultaneously impinging thereon a set of convex surfaces moving in a circular path around said axis, said surfaces being convex in the direction of rotation and discharging practically all of the material from said surfaces before it reaches the outer edges thereof into a current of hot gases and drying the resulting particles by contact therewith.

2. A method of producing microspheroidal siliceous catalysts of improved sphericity and attrition resistance which comprises preparing an aqueous two-phase slurry of hydrated silica-containing catalyst material, homogenizing said slurry and thereby reducing the dispersed phase thereof to more uniformly finely divided particles, spraying the homogenized slurry outwardly from an axis of rotation while simultaneously impinging thereon a set of convex surfaces moving in a circular path around said axis, said surfaces being convex in the direction of rotation, and discharging practically all of the material from said surfaces before it reaches the outer edges thereof into a current of hot gases and drying the resulting particles by contact therewith.

3. A method of producing microspheroidal siliceous catalysts of improved sphericity and attrition resistance which comprises spraying outwardly from an axis of rotation an aqueous dispersion of hydrated silica-containing catalyst material of about 4.0 to 9.0% solids content while simultaneously impinging thereon a set of convex surfaces moving in a circular path around said axis at a peripheral rate of about 15,000–30,000 feet per minute, said surfaces being convex in the direction of rotation, and discharging practically all of the material from said surfaces before it reaches the outer edges thereof into a current of hot gases and drying the resulting particles by contact therewith.

4. A method of producing microspheroidal siliceous catalysts of improved sphericity and attrition resistance which comprises preparing an aqueous two-phase slurry of hydrated silica-containing catalyst material of about 4.0 to 9.0% solids content, homogenizing said slurry and thereby reducing the dispersed phase thereof to more uniformly finely divided particles, spraying the homogenized slurry outwardly from an axis of rotation while simultaneously impinging thereon a set of convex surfaces moving in a circular path around said axis at a peripheral rate of about 15,000–30,000 feet per minute, said surfaces being convex in the direction of rotation, and discharging practically all of the material from said surfaces before it reaches the outer edges thereof into a current of hot gases and drying the resulting particles by contact therewith.

5. A method of producing silica-alumina catalysts in the form of microspheres of improved sphericity and attrition resistance which comprises spraying outwardly from an axis of rotation an aqueous dispersion of hydrated catalyst-forming material containing about 10% to 30% by weight of alumina and 90% to 70% by weight of silica on a dry solids basis and a solids content of about 4% to 9% while simultaneously impinging thereon a set of convex surfaces moving in a circular path around said axis at a peripheral rate of about 15,000–30,000 feet per minute, said surfaces being convex in the direction of rotation, and discharging practically all of the material from said surfaces before it reaches the outer edges thereof into a current of hot gases and drying the resulting particles by contact therewith.

References Cited in the file of this patent

UNITED STATES PATENTS

| | | |
|---|---|---|
| 2,010,101 | MacLachlan et al. | Aug. 6, 1935 |
| 2,384,455 | Daley et al. | Sept. 11, 1945 |
| 2,446,783 | Payne | Aug. 10, 1948 |
| 2,467,470 | Gerhold et al. | Apr. 19, 1949 |

FOREIGN PATENTS

| | | |
|---|---|---|
| 644,322 | Great Britain | Oct. 11, 1950 |